United States Patent
Ohira et al.

(10) Patent No.: US 6,512,032 B1
(45) Date of Patent: Jan. 28, 2003

(54) VINYLIDENE FLUORIDE RESIN COMPOSITIONS AND ARTICLES MOLDED THEREFROM

(75) Inventors: Seiichi Ohira, Ibaraki (JP); Kazuyuki Munakata, Ibaraki (JP); Toshiya Mizuno, Ibaraki (JP); Nobuyuki Masumura, Tochigi (JP)

(73) Assignee: Kureha Chemical Industry Co., Ltd., Tokyo (JP)

( * ) Notice: Subject to any disclaimer, the term of this patent is extended or adjusted under 35 U.S.C. 154(b) by 0 days.

(21) Appl. No.: 09/463,381

(22) PCT Filed: Jul. 28, 1997

(86) PCT No.: PCT/JP97/02599

§ 371 (c)(1),
(2), (4) Date: Feb. 28, 2000

(87) PCT Pub. No.: WO99/05212

PCT Pub. Date: Feb. 4, 1999

(51) Int. Cl.$^7$ .................................................. C08K 5/51
(52) U.S. Cl. ....................... 524/128; 524/151; 524/152; 524/153; 524/544
(58) Field of Search ................................ 524/128, 151, 524/152, 153, 544

(56) References Cited

U.S. PATENT DOCUMENTS 4,957,953 A * 9/1990 Kikkawa et al. ............. 524/99
6,054,538 A * 4/2000 Thulliez et al. ............. 525/199

FOREIGN PATENT DOCUMENTS

| | | |
|---|---|---|
| DE | 24 42 307 | 3/1975 |
| JP | 50-111147 | 9/1975 |
| JP | 52-119652 | 10/1977 |
| JP | 53-44953 | 12/1978 |
| JP | 57-74345 | 5/1982 |
| JP | 60-135445 | 7/1985 |
| JP | 60-188447 | 9/1985 |
| JP | 64-33147 | 2/1989 |
| JP | 1-254769 | 10/1989 |
| JP | 3-177442 | 8/1991 |
| JP | 6-101114 | 4/1994 |
| JP | 9-208784 | 8/1997 |

* cited by examiner

Primary Examiner—Peter D. Mulcahy
(74) Attorney, Agent, or Firm—Hollander Law Firm, P.L.C.

(57) ABSTRACT

A vinylidene fluoride resin composition which is stable to heat at molding temperatures and is free from foaming and coloration, and molded products made by forming the vinylidene fluoride resin composition are provided. The vinylidene fluoride resin composition of the present invention comprises 100 parts by weight of a vinylidene fluoride resin, 2–20 parts by weight of a polyester plasticizer, 0.01–0.5 parts by weight of a phosphite compound. The vinylidene fluoride resin composition may further comprises a phenol compound.

21 Claims, No Drawings

VINYLIDENE FLUORIDE RESIN COMPOSITIONS AND ARTICLES MOLDED THEREFROM

TECHNICAL FIELD

The present invention relates to a thermally stable vinylidene fluoride resin composition. More particularly, the present invention relates to a vinylidene fluoride resin composition comprising a polyester plasticizer and a specific amount of a phosphite compound added thereto. The resin composition can be formed without producing foams and being colored at molding temperatures.

BACKGROUND

Vinylidene fluoride resins are thermoplastic resins having favorable mechanical properties and exhibiting superior weather resistance, chemical resistance, and abrasion resistance. The resins are fabricated into various articles. Vinylidene fluoride resins are formed at a molding temperature of 200–350° C. by a molding operation such as compression molding, injection molding, extrusion molding, or blow molding. Because vinylidene fluoride resins are thermally deteriorated at such high molding temperatures, antioxidants are added in the same manner as in other plastics to ensure thermal stability during molding operations. For example, Japanese Patent Publication No. 44953/1978 discloses a composition comprising vinylidene fluoride resin and a stabilizer which is a combination of an organic phosphorous acid ester of polyhydric alcohol and pentaerythritol, dipentaerythritol, tripentaerythritol, or a mixture thereof. According to the invention of the publication, in the case using the resin as a paint composition almost no improvement in the deterioration time and adhesion time can be achieved by the composition prepared by the single addition of an oraganic phosphorous acid ester of polyhydric alcohol to a vinylidene fluoride resin. The deterioration time and adhesion time can be improved only in the case where 0.5–5 wt % of an organic phosphorous acid ester of polyhydric alcohol is added in the presence of 0.1–2 wt % of a polyhydric alcohol such as pentaerythritol, dipentaerythritol, or tripentaerythritol. In the observation of coloration of sheets which were press-molded on a heat press at 230° C., the effect of the addition of a phosphorous acid ester of polyhydric alcohol was confirmed when the organic phosphorous acid ester of polyhydric alcohol was added in the amount 0.5 wt % or more of the vinylidene fluoride resin, but not less than the amount of pentaerythritol which is also added simultaneously. This prior art document describes that even in this case, the products are colored, if 2 wt % of an organic phosphorous acid ester of polyhydric alcohol is added alone.

A phenol-type antioxidant is commonly used in the molding process of thermoplastic resins to improve the heat-resistant life. In the molding process of polypropylene at a temperature of 200° C. or higher where the resin is affected by a strong shearing force, a combined use of a phenol-type antioxidant and a phosphorus-type antioxidant is known to exhibit a synergistic effect. An antioxidant composition comprising a large amount of a phosphorus-type antioxidant, e.g. a composition containing a phosphorus-type antioxidant and a phenol-type antioxidant at a ratio of 3:1 to 1:1, is reported to be effective (Chemical Industry, April, pages 17–19, 1993).

Japanese Patent Application Laid-open No. 254769/1989 also discloses a method for improving heat stability of thermoplastic resins by the addition of a composition comprising a specific cyclic phosphite compound and a phenol compound to the thermoplastic resins. A specific proportion of the two compounds to be added disclosed by the patent application is an equivalent or smaller amount of a phenol compound for a given amount of a cyclic phosphite compound.

Vinylidene fluoride resins are known to be liable to cause various types of troubles when melt spun, due to their high melt viscosity and high viscosity during melt extrusion. Because of this, a plasticizer mutually soluble with vinylidene fluoride resins is added to decrease their melt viscosity and to provide the resins with softness. As one type of such plasticizers, aliphatic polyesters of an aliphatic dialcohol having 2–4 carbon atoms and an aliphatic dicarboxylic acid having 2–6 carbon atoms are known to exhibit excellent plasticizing effect while exhibiting minimal bleeding (Japanese Patent Application Laid-open No. 101114/1994). However, even such polyester plasticizers are not necessarily free from problems of bleed-out during and after a molding process.

Thus, various types of compositions useful in the molding operation of thermoplastic resins are known in the art. However, there have been no vinylidene fluoride resin compositions which can sufficiently prevent a foaming phenomenon, coloration, and bleed-out of additives during molding operation.

As mentioned above, vinylidene fluoride resins have a high melt viscosity, require a high molding temperature, tend to deteriorate or decompose,or may get colored or produce foam. For this reason, various plasticizers have been added to vinylidene fluoride resins to avoid their deterioration or decomposition, and to improve their processability.

However, even in the composition of a vinylidene fluoride resin to which a plasticizer is incorporated, the vinylidene fluoride resin itself may be deteriorated or decomposed, the plasticizer may be thermally decomposed or produce foams during mold processing, and a bleeding phenomenon may occur during or after mold processing depending on its type and the amount added.

As mentioned above, the addition of a phosphite compound in combination with pentaerythritol to a vinylidene fluoride resin which does not contain a polyester plasticizer has been known in the art. According to the above prior art document, a vinylidene fluoride resin colored when 2 wt % of a phosphite compound was added together with pentaerythritol.

As a result of extensive studies, the present inventors have found unexpectedly that when a small amount of a phosphite compound is added independently to a composition comprising 100 parts by weight of vinylidene fluoride resin and 2–20 parts by weight of polyester plasticizer (specifically, when 0.01–0.5 parts by weight of a phosphite compound is added to a composition comprising 100 parts by weight of vinylidene fluoride resin), such a vinylidene fluoride resin composition can exhibit superior heat resistance and controlled thermal deterioration at a temperature of 280° C. or higher, and can be formed without being colored or without producing foams. The inventors have further found that if a specific amount of phenol compound is added to this composition, not only the foaming phenomenon and coloration at higher temperatures can be prevented, but also tackiness due to bleed-out of plasticizers can be prevented through the product life. These findings have led to the completion of the present invention.

An object of the present invention is therefore to provide a vinylidene fluoride resin composition which is stable and free from a foaming phenomenon, coloration, and bleed-out of additives during molding operation. Another object of the present invention is to provide a molded product made from such a vinylidene fluoride resin composition.

DISCLOSURE OF THE INVENTION

Specifically, the present invention provides a vinylidene fluoride resin composition comprising 100 parts by weight of a vinylidene fluoride resin, 2–20 parts by weight of polyester plasticizer, and 0.01–0.5 parts by weight of a phosphite compound. The present invention further provides the above-described vinylidene fluoride resin composition which further comprises a phenol compound in an amount of 0–10 times the amount of the phosphite compound. The present invention further provides a molded product made from these resin compositions.

In a preferred embodiment of the present invention, the above composition comprises a phenol compound in an amount of 2–6 times the amount of the phosphite compound. The present invention further provides a molded product made from these resin compositions.

BEST MODE FOR CARRYING OUT THE INVENTION

In the present invention, a vinylidene fluoride resin means a vinylidene fluoride homopolymer or a vinylidene fluoride copolymer which is physico-chemically analogous to the homopolymer and contains 70 mol % or more of vinylidene fluoride as a constituent. Mixtures of such polymers are also included. As monomers which are copolymerized with vinylidene fluoride, tetrafluoroethylene, hexafluoropropylene, trifluoroethylene, trifluorochloroethylene, fluorovinyl, and the like can be given. These are used either individually or in combinations of two or more. As aliphatic polyester plasticizers which provide vinylidene fluoride resins with softness, aliphatic polyesters of an aliphatic dialcohol having 2–4 carbon atoms and an aliphatic dicarboxylic acid having 2–6 carbon atoms can be preferably used. As examples of an aliphatic dialcohol having 2–4 carbon atoms, ethylene glycol, propylene glycol, 1,4-butanediol, 1,2-butanediol, and the like can be given. As examples of an aliphatic dicarboxylic acid having 2–6 carbon atoms, oxalic acid, malonic acid, succinic acid, glutaric acid, adipic acid, and the like can be given.

The amount of plasticizers used is from 2 to 20 parts by weight, and preferably from 2 to 15 parts by weight, and more preferably from 3 to 10 parts by weight for 100 parts by weight of the vinylidene fluoride resin. If more than 20 parts by weight, properties of the vinylidene fluoride resin such as mechanical strength are impaired due to an excessive amount of plasticizers, making it impossible to provide molded products with desired strength. If less than 2 parts by weight, no effect of the addition of plasticizers can be obtained. Because the properties of the vinylidene fluoride resin used differs depending on the polymerization degree (molecular weight) and, when the resin is a copolymer, on the types and amount of comonomers, a specific amount of plasticizer to be added is selected from the range which enables a molding operation at a temperature of 350° C. or less, and preferably 300° C. or less, according to the properties of the resin and the characteristics of the target products.

To ensure a stable molding operation of a composition comprising 100 parts by weight of a vinylidene fluoride resin and 2–20 parts by weight of a polyester plasticizer at a temperature higher than 270° C., 0.01–0.5 parts by weight, preferably 0.05–0.3 parts by weight of a phosphite compound is added. This improves thermal stability of the composition comprising a vinylidene fluoride resin and polyester plasticizer, prevents the resin to be colored during molding operation, and remarkably suppress decomposition of the polyester plasticizer. If the amount of a phosphite compound added is less than 0.01 parts by weight or more than 0.5 parts by weight, a thermal stability effect cannot be obtained and the resin composition is colored or produces foams during a molding operation.

The phosphite compound used in the present invention is a compound combined a polyhydric alcohol having 3–5 carbon atoms such as pentaerythritol or propane triol, or its oligomer, with 1–3 phosphorus atoms (trivalent) by the ester bonding. Preferably, the phosphite compound is a compound obtained by the ester exchange of 1–3 phosphite esters represented by the formula, P≡(O-alkyl or phenyl) 3 with said polyhydric alcohol. Given as specific examples are bis-(2,6-di-tert-butyl-4-methylphenyl)-pentaerythritol diphosphite, tris(2,4-di-tert-butylphenyl)phosphite, distearylpentaerythritol diphosphite, bis-(tridecyl) pentaerythritol diphosphite, tetra(diphenylphosphite) pentaerythritol, diphenylpentaerythritol diphosphite, triphenyldipentaerythritol phosphite, tripentaerythritol diphosphite, phenylneopentyl phosphite, and trimethylolpropane phosphite. In addition, tri(alkyl group-substituted or non-substituted phenyl)phosphite, for example, tris (nonylphenyl) phosphite, trialkyl phosphite such as tris (2-ethylhexyl) phosphite, tris (tridecyl) phosphite, etc, and diphenyl mono(2-ethylhexyl)phosphite, and the like can also be used.

In the present invention, the addition of a phenol compound to said composition which comprises a vinylidene fluoride resin, polyester plasticizer, and phosphite compound further improves thermal stability. The use of a phenol compound in addition to a phosphite compound can increase thermal stability. The combined use of a phenol compound is particularly preferable when a large heat history is involved, for example, when the resin composition is processed at a high temperature.

The phenol compound exerts a synergistic action with the phosphite compound which is present together, specifically, the compound not only increases thermal stability of the vinylidene fluoride resin composition during processing at a high temperature, but also effectively suppresses bleed-out of plasticizers during or after the molding operation, thereby preventing occurrence of coloration and foaming phenomenon.

As a phenol compound used for such an object, it is preferable that the compound has phenolic hydroxyl groups by the possession, in the molecule, of 1 to 4 benzene rings with 1–3 substituted alkyl groups and hydroxyl groups on the rings. Given as specific examples are tetrakis-[methylene-3-(3',5'-di-tert-butyl-4-hydroxyphenyl) propionate]methane, 4,4'-iso-propylidene diphenol, stearyl (3,5-di-tert-butyl-4-hydroxyphenyl)propionate, thiodiethylene glycol bis[(3,5-di-tert-butyl-4-hydroxyphenyl) propionate], 1,6-hexamethylenebis[(3,5-di-tert-butyl-4-hydroxyphenyl) propionic acid amide], 2,2'-methylenebis(4-ethyl-6-tert-butylphenol, 4,4'-butylidenebis(6-tert-butyl-cresol), 2,2'-ethylidenebis(4,6-di-tert-butyl phenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(3,5-di-tert-butyl-4-hydroxybenzyl)isocyanurate, 1,3,5-tris(3,5-di-tertbutyl-4-hydroxybenzyl)-2,4,6-trimethylbenzene, and 2-tert-butyl-4-methyl-5-methylbenzyl)phenol. In addition, 2,6-diphenyl-4-octadecyloxyphenol and the like can also be used as a phenol compound in the present invention.

The addition of a phenol compound is preferable because the phenol compound expands the range of selection for the types and amount of plasticizers which can be used. The addition of a phenol compound alone is undesirable, because the phenol compound itself is decomposed and coloring is occurred if phosphite compound is not present.

The amount of the phenol compound used is preferably 10 times or less, more preferably 8 times or less, and particularly preferably 2 to 6 times by weight the amount of the phosphite compound.

If the amount of a phenol compound is equivalent to or less than the amount of the phosphite compound, a sufficient effect cannot be obtained by the addition of the phenol compound. If the amount of a phenol compound is greater than 10 times the amount of a phosphite compound, the phenol compound itself may be decomposed and the degree of foaming and coloring are increased. The above composition comprising a vinylidene fluoride resin, a polyester plasticizer, and a phosphite compound, and the composition further comprising a phenol compound can be formed into various products such as fibers, films, and sheets, without producing foams and colors at a molding temperature, while extremely suppressing bleed-out of the plasticizer from the product. A conventional molding method such as compression molding, injection molding, extrusion molding, or blow molding at a molding temperature of 200–350° C. can be used. In molding the resin, components of the appropriate vinylidene fluoride resin composition are selected according to the objects to be formed.

It is no problem to add commonly used molding additives such as a lubricant, pigment, and the like, when molding the resin composition.

As mentioned above, the composition prepared by adding a specific amount of a polyester plasticizer and a phosphite compound to a vinylidene fluoride resin can be formed without foaming or coloring at a molding temperature. The composition prepared by further adding a phenol compound to said composition is stable at a high temperature.

The present invention will now described in more detail by showing examples and comparative examples.

In the following examples and comparative examples, bis-(2,6-di-tert-butyl-4-methylphenyl)-pentaerythritol diphosphite was used as a phosphite compound, and tetrakis-[methylene-3-(3',5'-di-tert-butyl-4'-hydroxyphenyl) propionate]methane was used as a phenol compound.

EXAMPLE 1–2 AND COMPARATIVE EXAMPLE 1–3

A composition comprising 100 parts by weight of a vinylidene fluoride homopolymer having $\eta_{inh}$ of 1.3 dl/g, 5 parts by weight of a polyester plasticizer having an average molecular weight of 2,200 which was prepared from propylene glycol and adipic acid, and the phosphite compound in the amount shown in Table 1 was press-molded at 240° C. to obtain a 5 cm ×5 cm sheet with a thickness of 1 mm. The sheet was subjected to a thermal stability test.

The sheet was sandwiched between hot plates and maintained at 280° C. or 300° C. for a prescribed period of time, following which change in the color and foaming conditions were examined. Results are shown in Table 1.

A plasticizer bleed-out acceleration test was carried out by allowing the test sample to stand in a gear oven at 80° C. and a load of 5 kg for 30 days. After 30 days, the surface of the sample was washed with tetrahydrofuran to obtain a tetrahydrofuran solution which may contain a Bleed-out plasticizer. The molecular weight distribution of the material dissolved in the tetrahydrofuran solution was measured by liquid chromatography (150-C, ALC/GPC manufactured by Waters Co.) to examine the conditions of plasticizer decomposition. The degree of bleed-out was judged by applying the value calculated from the following formula to the following evaluation criteria. The results are shown in Table 1.

[{(Mass of the sample before bleed-out test)−(Mass of the sample after bleed-out test)}/(Mass of the sample before bleed-out test)]×100=W(%)

Bleed-out small: W<0.3%

Bleed-out medium: 0.3%≦W≦0.5%

Bleed-out large: W<0.5%

TABLE 1

|  | (A) | (B) | Ratio (A:B) | Heating temp. (° C.) | Heating time (min) | Color of sample | Bleed-out of plasticizer | Decomposition of plasticizer |
| --- | --- | --- | --- | --- | --- | --- | --- | --- |
| Example 1 | 0.05 | 0 |  | 280 | 0 | No change | Medium | No Decomposition |
|  |  |  |  |  | 15 | No change | Medium | No Decomposition |
|  |  |  |  |  | 30 | No change | Medium | No Decomposition |
| Comparative Example 1 | 0 | 0 |  | 280 | 0 | No change | Medium | No Decomposition |
|  |  |  |  |  | 15 | Reddish brown |  | Decomposed *1 |
|  |  |  |  |  | 30 | Brackish brown | Medium | Decomposed *2 |
| Comparative Example 2 | 0.005 | 0 |  | 280 | 0 | No change | Medium | No Decomposition |
|  |  |  |  |  | 15 | Yellowish brown | Medium | Decomposed *1 |
|  |  |  |  |  | 30 | Reddish brown | Medium | Decomposed *2 |
| Comparative Example 3 | 1.0 | 0 |  | 280 | 0 | No change | Large | No Decomposition |
|  |  |  |  |  | 15 | Foamed | Large | No Decomposition |
|  |  |  |  |  | 30 | Foamed | Large | No Decomposition |
| Example 2 | 0.05 | 0 |  | 300 | 0 | No change | Medium | No Decomposition |
|  |  |  |  |  | 15 | No change | Medium | No Decomposition |
|  |  |  |  |  | 30 | Yellowish brown | Medium | No Decomposition |

(A): Phosphite compound (part by weight)
(B): Phenol compound (part by weight)
*1: Produced adipic acid by decomposition
*2: Almost all plasticizer decomposed to adipic acid

EXAMPLE 3–4 AND COMPARATIVE EXAMPLE 4–7

A composition comprising 100 parts by weight of a vinylidene fluoride homopolymer having $\eta_{inh}$ of 1.3 dl/g, 5 parts by weight of a polyester plasticizer having an average molecular weight of 2,200 which was prepared from propylene glycol and adipic acid, and phosphite compound and phenol compound in each amount shown in Table 2 was press-molded at 240° C. to obtain a 5 cm×5 cm sheet with a thickness of 1 mm. The sheet was subjected to the thermal stability test.

The sheet was sandwiched between hot plates and maintained at 280° C. or 300° C. for a prescribed period of time, following which change in color and foaming conditions were examined. The results are shown in Table 2.

TABLE 2

|  | (A) | (B) | Ratio (A:B) | Heating temp. (° C.) | Heating time (min) | Color of sample | Bleed-out of plasticizer | Decomposition of plasticizer |
|---|---|---|---|---|---|---|---|---|
| Example 3 | 0.05 | 0.15 | 1:3 | 280 | 0 | No change | Small | No Decomposition |
|  |  |  |  |  | 15 | No change | Small | No Decomposition |
|  |  |  |  |  | 30 | No change | Small | No Decomposition |
| Example 4 | 0.05 | 0.15 | 1:3 | 300 | 0 | No change | Small | No Decomposition |
|  |  |  |  |  | 15 | No change | Small | No Decomposition |
|  |  |  |  |  | 30 | No change | Small | No Decomposition |
| Comparative Example 4 | 0.005 | 0.005 | 1:1 | 300 | 0 | No change | Medium | No Decomposition |
|  |  |  |  |  | 15 | Yellowish brown | Medium | No Decomposition |
|  |  |  |  |  | 30 | Reddish brown | Medium | No Decomposition |
| Comparative Example 5 | 1.0 | 5.0 | 1:5 | 300 | 0 | No change | Small | No Decomposition |
|  |  |  |  |  | 15 | Foamed, blackish brown | Small | No Decomposition |
|  |  |  |  |  | 30 | Foamed, black | Small | No Decomposition |
| Comparative Example 6 | 0.05 | 5.0 | 1:20 | 300 | 0 | No change | Small | No Decomposition |
|  |  |  |  |  | 15 | Yellowish brown | Small | No Decomposition |
|  |  |  |  |  | 30 | Reddish brown | Small | No Decomposition |
| Comparative Example 7 | 0.7 | 0.1 | 7:1 | 300 | 0 | No change | Large | No Decomposition |
|  |  |  |  |  | 15 | Foamed | Large | No Decomposition |
|  |  |  |  |  | 30 | Foamed | Large | No Decomposition |

(A): Phosphite compound (part by weight)
(B): Phenol compound (part by weight)

INDUSTRIAL APPLICATION

The composition prepared by adding a specific amount of a polyester plasticizer and a phosphite compound to a vinylidene fluoride resin can be formed without foaming or coloring at a molding temperature. In addition the composition prepared by further adding a phenol compound to said composition is stable at a high temperature. Therefore, various resin formed products such as fibers, films, and sheets can be manufactured from the composition of the present invention, without coloration phenomenon and bleed-out phenomenon.

What is claimed is:

1. A vinylidene fluoride resin composition comprising:
   100 parts by weight of a vinylidene fluoride resin,
   2–20 parts by weight of a polyester plasticizer,
   0.01–0.5 parts by weight of a phosphite compound, and
   a phenol compound in an amount of 2–6 times the amount of the phosphite compound.

2. The vinylidene fluoride resin composition according to claim 1, wherein the phosphite compound is bis-(2,6-di-t-butyl-4-methylphenyl)-pentaerythritol diphosphite.

3. The vinylidene fluoride resin composition according to claim 1, wherein the phenol compound is tetrakis[methylene-3-(3',5'-di-t-butyl-4'-hydroxyphenyl) propionate]methane.

4. A formed product made from the composition according to claim 1.

5. Fiber made from the composition according to claim 1.

6. A sheet made from the composition according to claim 1.

7. The vinylidene fluoride resin composition according to claim 2, wherein the phenol compound is tetrakis[methylene-3-(3',5'-di-t-butyl-4'-hydroxyphenyl) propionate]methane.

8. A formed product made from the composition according to claim 2.

9. A formed product made from the composition according to claim 3.

10. A formed product made from the composition according to claim 7.

11. Fiber made from the composition according to claim 2.

12. Fiber made from the composition according to claim 3.

13. A sheet made from the composition according to claim 2.

14. A sheet made from the composition according to claim 3.

15. A vinylidene fluoride resin composition as claimed in claim 1, wherein said vinylidene fluoride resin is at least one of:
   a vinylidene fluoride homopolymer,
   at least one copolymer containing 70 mol % or more of vinylidene fluoride copolymerized with a comonomer selected from the group consisting of tetrafluoroethylene, hexafluoropropylene, trifluoroethylene, trifluorochloroethylene, fluorovinyl, and mixtures thereof, or
   mixtures of said at least one homopolymer and said at least one copolymer.

16. The vinylidene fluoride resin composition according to claim 15 wherein the phosphite compound is bis-(2,6-di-t-butyl-4-methylphenyl)-pentaerythritol diphosphite.

17. The vinylidene fluoride resin composition according to claim 15, wherein the phenol compound is tetrakis [methylene-3-(3',5'-di-t-butyl-4'-hydroxyphenyl) propionate]methane.

18. The vinylidene fluoride resin composition according to claim 15, wherein said polyester plasticizer comprises an aliphatic polyester of an aliphatic dialcohol having 2–4 carbon atoms and an aliphatic dicarboxylic acid having 2–6 carbon atoms.

19. A formed product, a fiber or a sheet made from the composition according to claim 15.

20. A formed product, a fiber or a sheet made from the composition according to claim 16.

21. A formed product, a fiber or a sheet made from the composition according to claim 7.

* * * * *